United States Patent
Arimitsu et al.

(10) Patent No.: US 6,903,471 B2
(45) Date of Patent: Jun. 7, 2005

(54) STATOR COOLING STRUCTURE FOR MULTI-SHAFT, MULTI-LAYER ELECTRIC MOTOR

(75) Inventors: Minoru Arimitsu, Kanagawa (JP); Takashi Kato, Kanagawa (JP); Shuzo Miyake, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/476,172

(22) PCT Filed: Mar. 28, 2003

(86) PCT No.: PCT/JP03/03921

§ 371 (c)(1), (2), (4) Date: Nov. 3, 2003

(87) PCT Pub. No.: WO03/084028

PCT Pub. Date: Oct. 9, 2003

(65) Prior Publication Data

US 2004/0145252 A1 Jul. 29, 2004

(30) Foreign Application Priority Data

Apr. 1, 2002 (JP) .......................................... 2002-098257
Aug. 8, 2002 (JP) .......................................... 2002-231679

(51) Int. Cl.[7] .......................... H02K 9/08; H02K 5/16; H02K 1/22; H02K 16/00; H02K 47/04
(52) U.S. Cl. .................... 310/59; 310/57; 310/113; 310/114; 310/216; 310/259; 310/266
(58) Field of Search ............................ 310/52, 54, 57, 310/58, 59, 60 A, 112, 113, 114, 216, 259, 266; 105/59; 363/104

(56) References Cited

U.S. PATENT DOCUMENTS

| 3,462,626 | A | * | 8/1969 | Kluss ........................ 310/114 |
| 4,532,447 | A | * | 7/1985 | Cibie ........................ 310/114 |
| 5,793,136 | A | * | 8/1998 | Redzic ...................... 310/114 |
| 5,886,433 | A | * | 3/1999 | Oda et al. .................. 310/59 |
| 5,973,427 | A | * | 10/1999 | Suzuki et al. ............... 310/54 |
| 6,114,784 | A |   | 9/2000 | Nakano |
| 6,590,312 | B1 | * | 7/2003 | Seguchi et al. ............. 310/266 |

FOREIGN PATENT DOCUMENTS

| EP | 1 164 688 A2 | 12/2001 |
| JP | 2000-14086 A | 1/2000 |

* cited by examiner

Primary Examiner—Tran Nguyen
(74) Attorney, Agent, or Firm—Foley & Lardner LLP

(57) ABSTRACT

A multi-shaft, multi-layer motor has a stator coaxially disposed between inner and outer rotors which are driven independently by a compound current. For cooling stator coils, first through last branch coolant passages are arranged around the axis. The upstream ends of the first through last branch passages are arranged in sequence circumferentially along a distributing circumferential passage in a direction away from a common introduction port for introducing the coolant into the distributing circumferential passage, and the downstream ends of the first through last branch passages are distributed in sequence circumferentially along a collecting circumferential passage in a direction toward a common discharge port for discharging the coolant from the collecting circumferential passage.

14 Claims, 18 Drawing Sheets

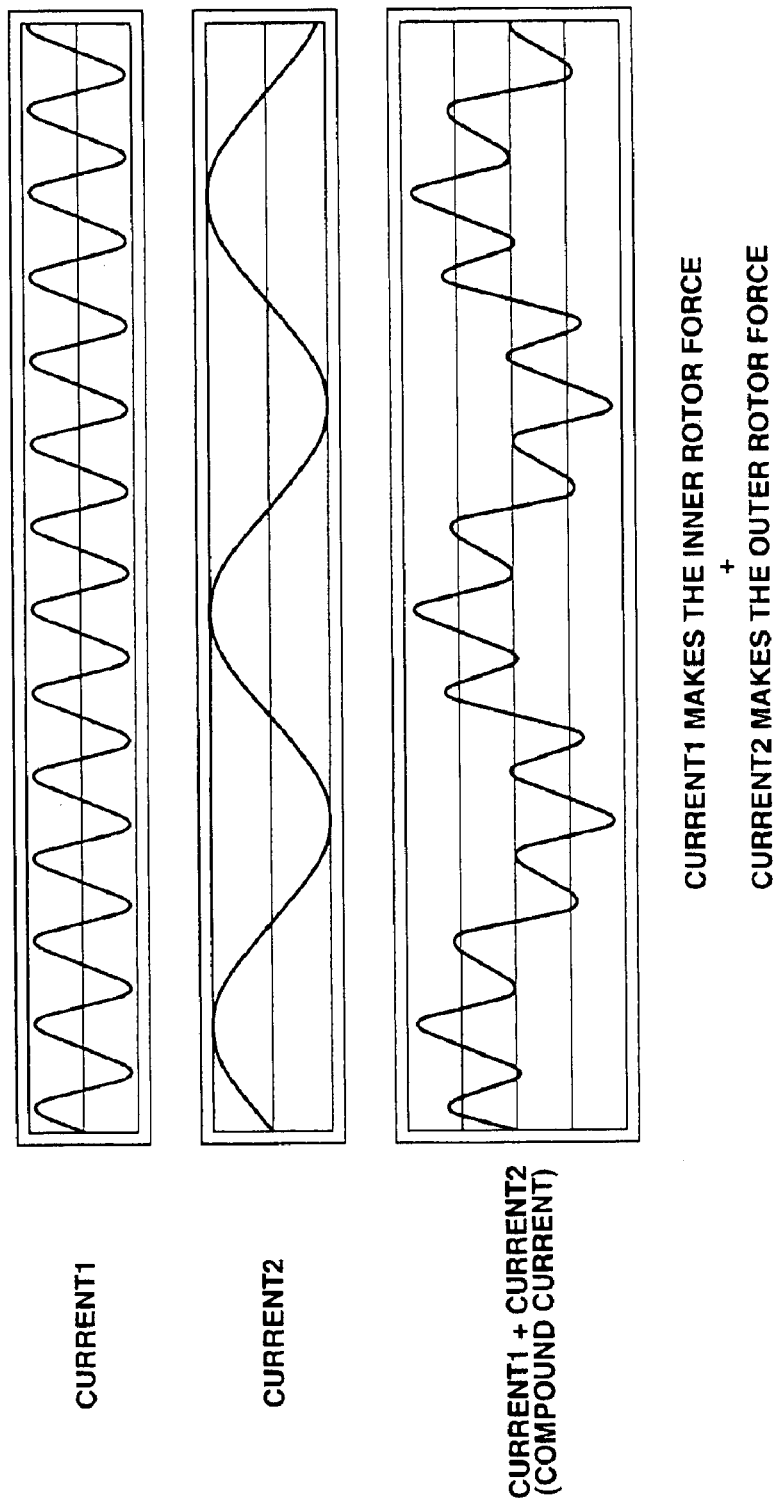

STATOR COOLING STRUCTURE FOR MULTI-SHAFT, MULTI-LAYER ELECTRIC MOTOR

TECHNICAL FIELD

The present invention relates to a cooling structure for an electric motor, and more specifically to a stator cooling structure for a multi-shaft, multi-layer motor which can be applied to a drive unit for a hybrid vehicle.

BACKGROUND ART

Published Japanese Patent Application, Kokai No. 2000-14086 shows a stator cooling structure of multi-shaft, multi-layer motor. In this structure, a stator assembly includes portions filled with a resin of good heat transfer efficiency, and formed with coolant passages for cooling the stator through the resin by cooling the resin.

DISCLOSURE OF INVENTION

It is an object of the present invention to provide a cooling structure for cooling a stator of a motor more evenly.

According to one aspect of the present invention, a multi-shaft, multi-layer motor comprises: a stator assembly which is disposed coaxially between inner and outer rotors, and which comprises: a plurality of laminated members arranged regularly around a center axis of the motor, and each provided with a coil; a portion defining a coolant introduction passage to introduce a coolant for drawing off heat produced by the coils; a coolant distributing annular cover member including a circumferential partition wall separating a first circumferential coolant passage and a second circumferential coolant passage, the first circumferential coolant passage including an inlet end connected with the introduction passage, to receive the coolant from the introduction passage; a coolant distributing plate member formed with first distribution holes communicating with the first circumferential coolant passage, and second distribution holes communicating with the second circumferential coolant passage; portions defining first axial coolant passages each extending, in an axial direction of the motor, from a first axial end communicating with one of the first distribution holes, to a second axial end; portions defining second axial coolant passages each extending, in the axial direction, from a second axial end to a first axial end communicating with one of the second distribution holes; a U-turn cover member formed with connecting portions each to connect the second ends of one of the first axial passages and one of the second axial passages which are adjacent to each other in a circumferential direction around the center axis; and a portion defining a coolant discharge passage connected with an outlet end of the second circumferential passage, and arranged to discharge the coolant from an outlet end of the second circumferential passage.

According to another aspect of the present invention, a multi-shaft, multi-layer motor comprises: an inner rotor; an outer rotor surrounding the inner rotor; and a stator assembly disposed coaxially between the inner and outer rotors, the stator assembly comprising: a plurality of stator segments arranged around a center axis of the motor, each of the stator segments including a stator coil; portions defining first through last branch passages arranged around the center axis, each of the branch passages extending from an upstream end to a downstream end to cool the stator coils; and a distributing section defining a distributing circumferential passage to deliver a coolant from a common introduction port to the upstream ends of the first through last branch passages, and a collecting circumferential passage to convey the coolant from the downstream ends of the first through last branch passages to a common discharge port. The distributing circumferential passage and the collecting circumferential passage extend circumferentially around the center axis. The upstream ends of the first through last branch passages are arranged in sequence along the distributing circumferential passage in a direction away from the common introduction port. The downstream ends of the first through last branch passages are distributed in sequence along the collecting circumferential passage in a direction toward the common discharge port.

The other objects and features of this invention will become understood from the following description with reference to the accompanying drawings.

BRIEF DESCRIPTION OF DRAWINGS

FIG. 18 is a graph showing a compound current supplied to stator coils of the multi-shaft, multi-layer motor according to the first or second embodiment.

MODE(S) FOR CARRYING OUT THE INVENTION

FIGS. 1~12 shows a first embodiment of the present invention. FIGS. 13~17 shows a second embodiment.

Figure 1:
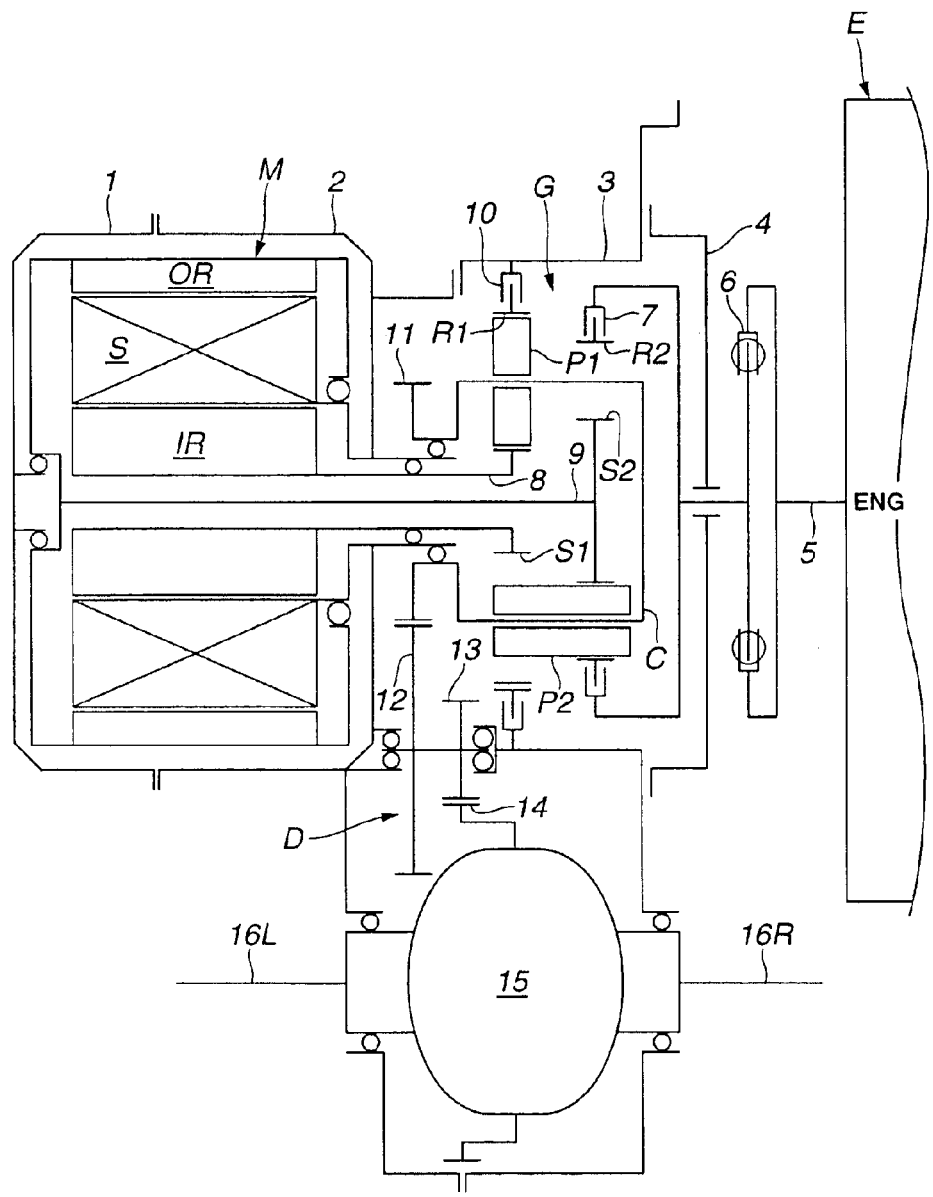
FIG. 1 is a schematic view showing a hybrid power system including a multi-shaft, multi-layer motor according to a first embodiment of the present invention.

FIG. 1 shows a hybrid drive system or unit including a multi-shaft, multi-layer motor M according to the first embodiment. The hybrid drive unit of FIG. 1 includes an engine E, multi-shaft, multi-layer motor M, a Ravigneaux type compound planetary gear train G, and a drive output mechanism D. As shown in FIG. 1, this system includes a motor cover 1, a motor case 2, a gear housing 3 and a front cover 4.

Engine E is a primary power source in the hybrid drive system of this example. An engine output shaft 5 of engine E is connected with a second ring gear R2 of Ravigneaux compound planetary gear set G, through a damper system 6 for absorbing rotational fluctuation, and a multiple disk clutch 7.

Multi-shaft, multi-layer motor M is a secondary power source in the hybrid system of this example. Despite its appearance like a single motor unit, multi-shaft, multi-layer motor M can function as two motor/generators. Multi-shaft, multi-layer motor M of this example includes a stator S, an inner rotor IR surrounded coaxially by stator S, and an outer rotor OR surrounding stator S coaxially. Thus, multi-shaft, multi-layer motor M of this example has a coaxial three-layer structure. Stator S is fixed to motor case 2, and provided with coils. Inner rotor IR includes permanent magnets embedded therein. Outer rotor OR includes permanent magnets embedded therein.

A first motor hollow shaft 8 fixed with inner rotor IR is connected to a first sun gear S1 of Ravigneaux compound planetary gear train G. A second motor shaft 9 fixed with outer rotor OR is connected to a second sun gear S2 of Ravigneaux compound planetary gear train G.

Ravigneaux compound planetary gear train G is a planetary gear system which can vary the speed ratio continuously in a stepless manner by controlling the two motor speeds of multi-shaft, multi-layer motor M. Common planet carrier C supports first pinions P1 and second pinions P2 each engaging with one of first pinions P1. Ravigneaux compound planetary gear train G of this example has the following five active rotary elements: common carrier C; first sun gear S1 engaging with first pinions P1; second sun gear S2 engaging with second pinions P2; a first ring gear R1 engaging with first pinions P1; and a second ring gear R2 engaging with second pinions P2. A multiple disk brake 10 is connected between first ring gear R1 and gear housing 3. Common carrier C is connected with an output gear 11.

Drive output mechanism D includes output gear 11 connected with common carrier C, a first counter gear 12, a second counter gear 13, a drive gear 14, a differential 15, and left and right drive shafts 16L and 16R. Output torque is transmitted from output gear 11, through first counter gear 12→ second counter gear 13→ drive gear 14→ differential 15, and further transmitted through left and right drive shafts 16L and 16R to drive wheels of the vehicle.

In this hybrid drive system, second ring gear R2 is connected with engine output shaft 5; first sun gear S1 is connected with first motor hollow shaft 8; second sun gear S2 is connected with second motor shaft 9; and common carrier C is connected with output gear 11.

Figure 2:
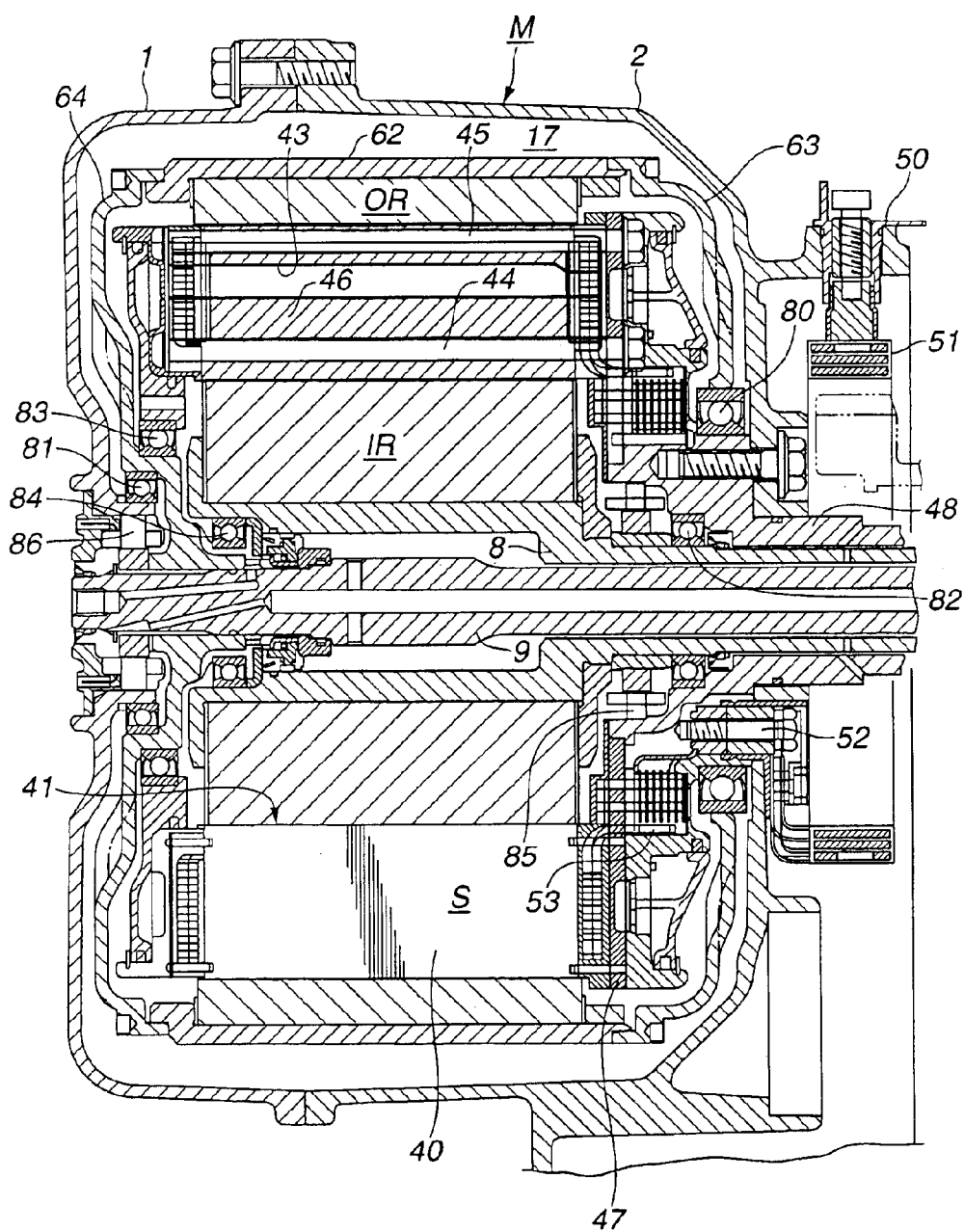
FIG. 2 is a vertical sectional view showing the multi-shaft, multi-layer motor according to the first embodiment.
Figure 3:
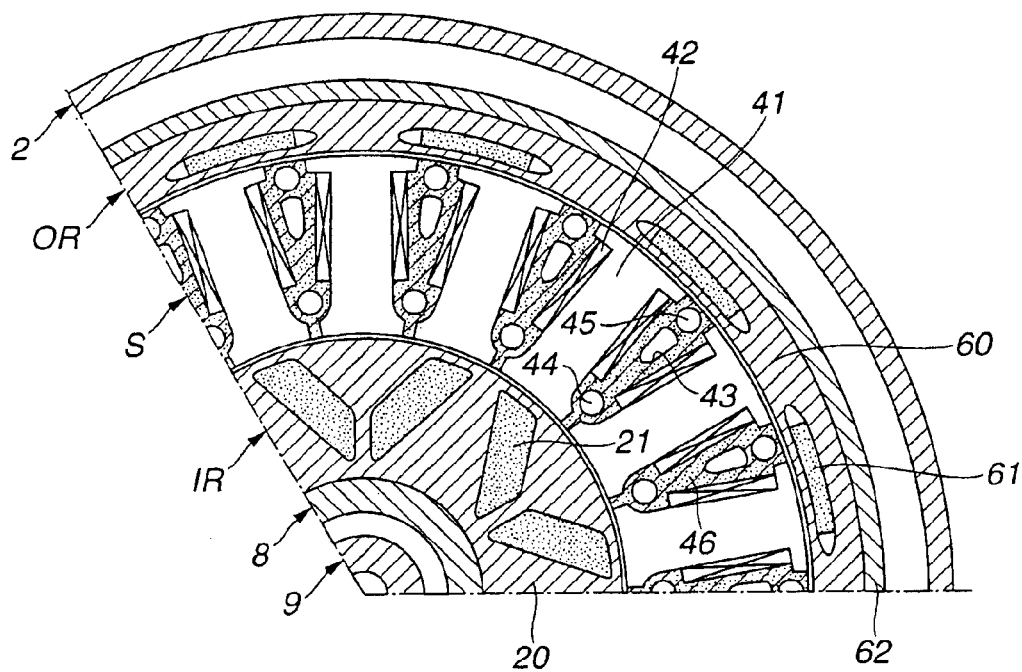
FIG. 3 is a cross sectional view showing a part of the multi-shaft, multi-layer motor of FIG. 2, as viewed from a front side.
Figure 4:
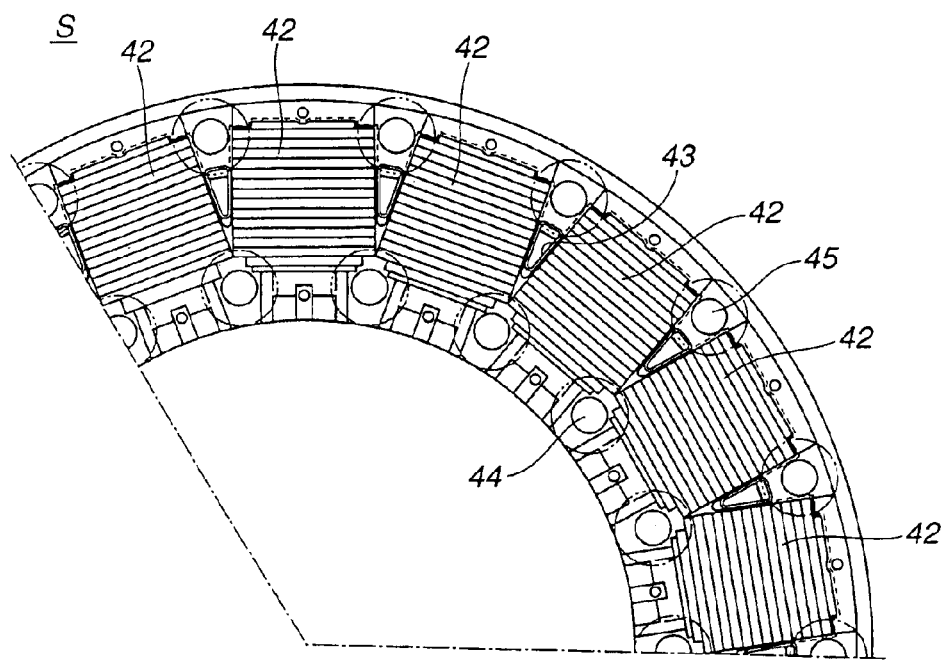
FIG. 4 is a cross view showing a part of the multi-shaft, multi-layer motor of FIG. 2, as viewed from a back side.

FIGS. 2, 3 and 4 show multi-shaft multi-layer motor M having the stator cooling structure according to the first embodiment. In a motor chamber 17 enclosed by motor cover 1 and motor case 2 as shown in FIG. 2, there is disposed multi-shaft, multi-layer motor M composed of inner rotor IR, stator S and outer rotor OR.

Inner rotor IR is fixed to first motor hollow shaft 8. In this example, inner rotor IR is fixed to first motor hollow shaft 8 by press-fit (or shrinkage fit) of the inner cylindrical surface of inner rotor IR on a stepped shaft end of first motor hollow shaft 8. Twelve inner rotor magnets 21 (permanent magnets) are arranged to produce desirable magnetic flux, and embedded axially in a rotor base 20 of inner rotor IR, as shown in FIG. 3. In this example, two of the magnets 21 are paired in a V-shaped form, and polarized to the same polarity, so that there are three pole pairs.

Stator S includes a stator piece laminated members 41 of thin superposed stator pieces 40; coils 42; coolant (branch) passages 43; inner bolts 44; outer bolts 45; and a resin molding portion 46. A front end of stator S is fixed, through a front end plate 47 and a stator shaft 48, to motor case 2.

There are eighteen of the coils 42 in this example. These coils 42 are arranged in a circle in the form of three repetitions of 6-phase coils. A compound current as shown in FIG. 18 is applied from an inverter (not shown), to the six-phase coils 42, through a feed terminal 50, a bus bar radial lamination 51, a feed connector 52 and a bus bar axial lamination 53. This compound current is composed of 3-phase alternating current for driving outer rotor OR, and 6-phase alternating current for driving inner rotor IR.

Outer rotor OR is fit in an outer rotor case 62, and fixed to outer rotor case 62 by brazing or by bonding. Outer rotor case 62 includes a front side to which a front connecting case 63 is fixed, and a rear side to which a rear connecting case 64 is fixed. Second motor shaft 9 is connected by splines to rear connecting case 64. As shown in FIG. 3, outer rotor magnets 61 (permanent magnets) are arranged so as to produce magnetic flux and embedded in a rotor base 60. Each outer rotor magnet 61 extends axially, and has hollow portions on both sides. In this example, there are provided twelve of the outer rotor magnets 61. Unlike inner rotor magnets 21, the polarity is changed one by one, and there are formed six pole pairs.

As shown in FIG. 2, front and rear bearings 80 and 81 support outer rotor OR on motor case 2 and motor caver 1. A bearing 82 supports inner rotor IR on motor case 2. A bearing 83 supports stator S on outer rotor OR. A bearing 84 is an intermediate bearing disposed between first motor hollow shaft 8 and second motor shaft 9.

As shown in FIG. 2, an inner rotor resolver 85 is a device for sensing a rotational position of inner rotor IR. An outer rotor resolver 86 is for sensing a rotational position of outer rotor OR.

Figure 5:
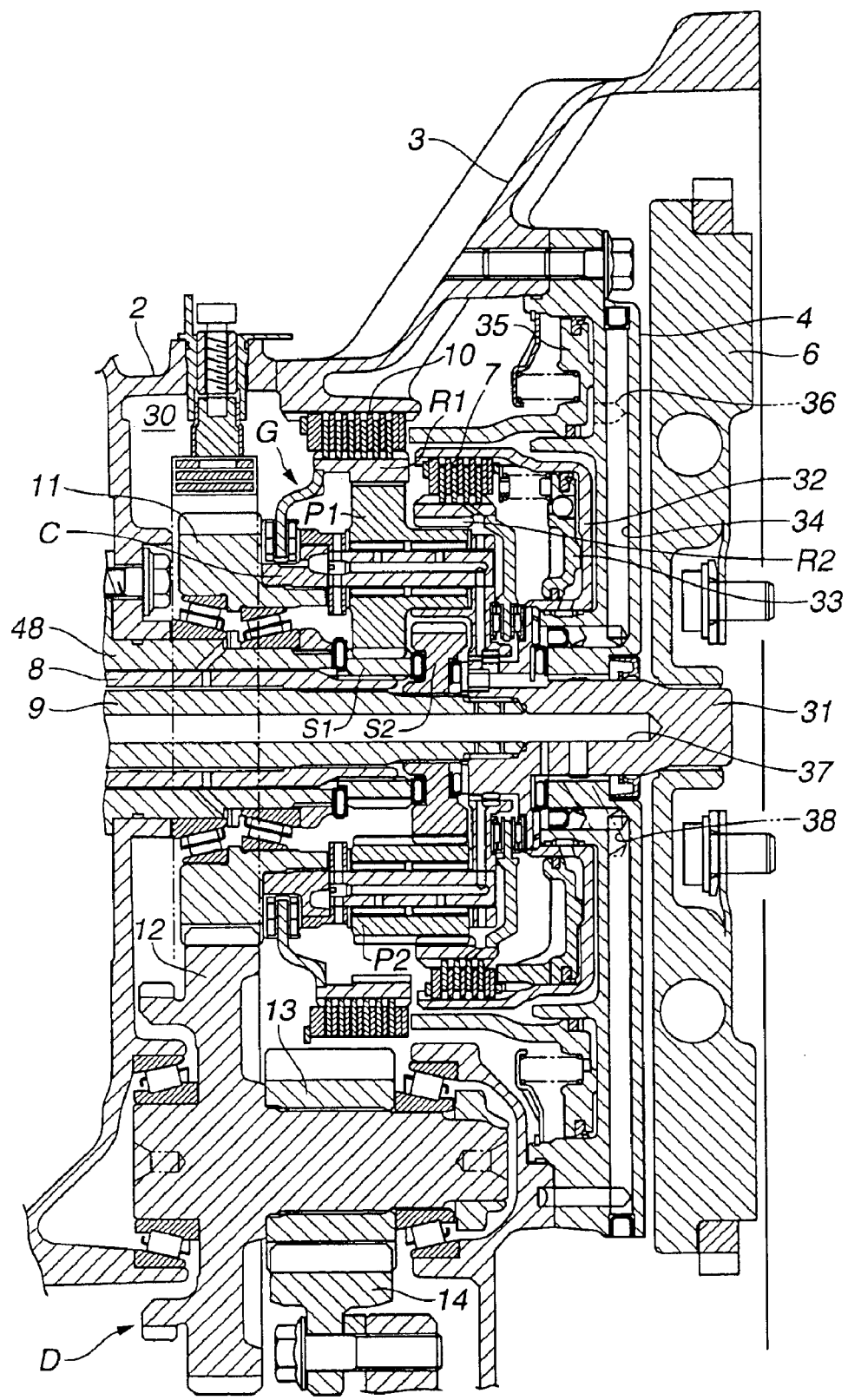
FIG. 5 is a vertical sectional view showing a Ravigneaux planetary gear train G and a drive output mechanism D in the hybrid power system of FIG. 1.

As shown in FIG. 5, Ravigneaux planetary gear train G and drive output mechanism D are disposed in a gear chamber 30 enclosed by motor case 2, gear housing 3 and front cover 4.

When multiple disk clutch 7 is engaged, drive torque of engine E is inputted to second ring gear R2 of Ravigneaux planetary gear train G, through flywheel damper mechanism 6 for absorbing rotational fluctuation, a transmission input shaft 31, and a clutch drum 32. First sun gear S1 is connected by splines with first motor hollow shaft 8. Inner rotor IR is connected with first sun gear S1 so that rotation of a first torque and a first rotational speed is inputted from inner rotor IR to first sun gear S1 according to the location of a motor operating point. Second sun gear S2 is connected by splines with second motor shaft 9. Outer rotor OR is connected with second sun gear S2 so that rotation of a second torque and a second rotational speed is inputted from outer rotor OR to second sun gear S2 according to the location of a motor operating point.

Multiple disk brake 10 is disposed between first ring gear R1 and gear housing 3. First ring gear R1 is held by brake 10 when brake 10 is engaged in the case of an operation for starting the vehicle, for example. Common planet carrier C is connected by splines with output gear 11, which is supported rotatably on stator shaft 48 by bearing.

Drive output mechanism D includes first counter gear 12 engaging with output gear 11, second counter gear 13 provided on a shaft portion of first counter gear 12, and drive gear 14 engaging with second counter gear 13. A final reduction ratio is determined by the ratio between the number of teeth of second counter gear 13 and the number of teeth of drive gear 14.

Front cover 4 is formed with a clutch pressure oil passage 34 for supplying a fluid pressure for a clutch piston 33 of multi disk clutch 7. Front cover 4 is further formed with a brake pressure oil passage 36 for supplying a fluid pressure for a brake piston 35 of multi disk brake 10. On the inner side of front cover 4, clutch piston 33 is surrounded by brake piston 35. Furthermore, transmission input shaft 31 is formed with an axially extending center oil passage 37, to which a lubricating oil is supplied through a lubricating oil passage 38 formed in front cover 4.

Figure 6:
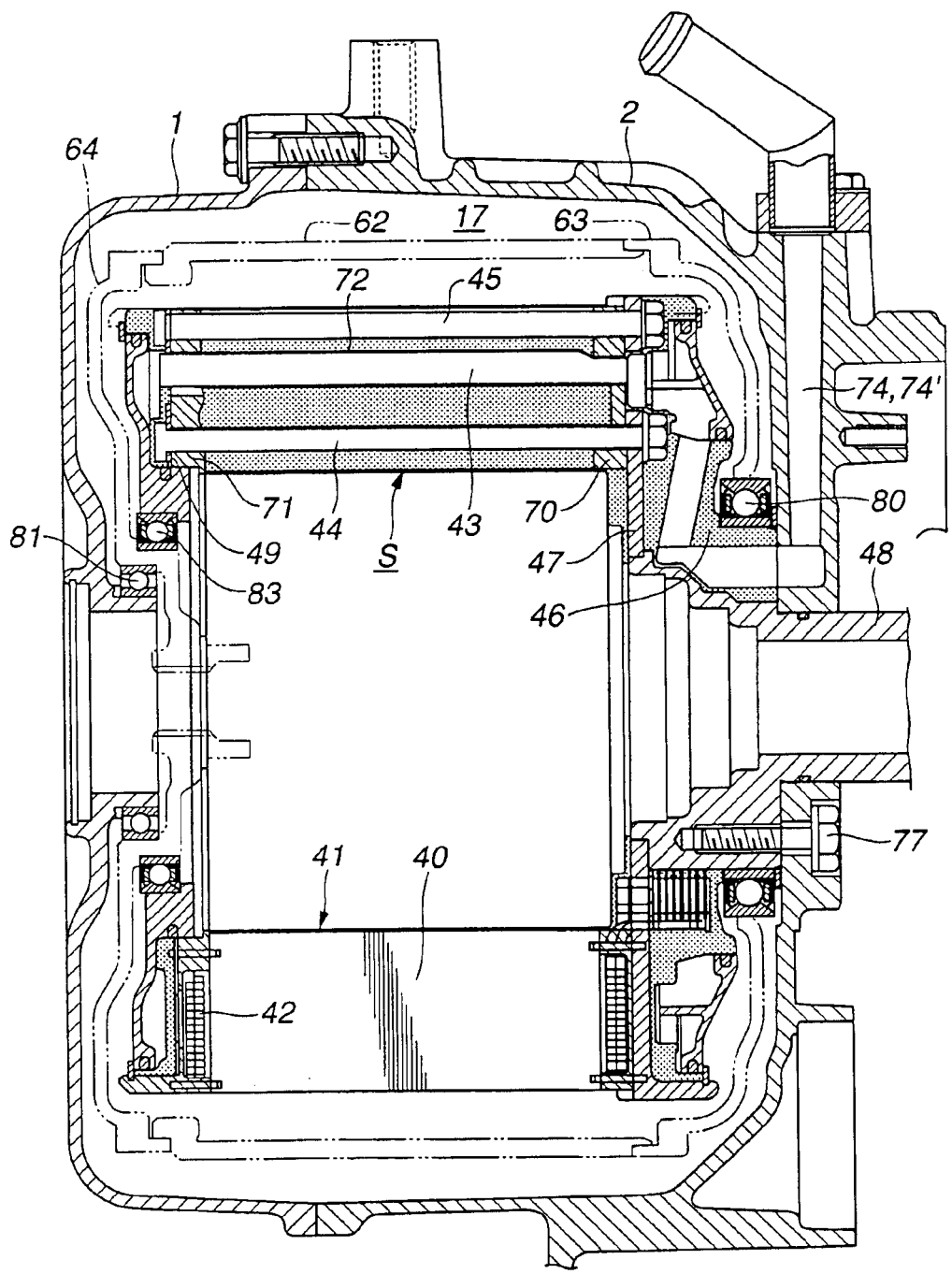
FIG. 6 is a vertical sectional view showing a stator and a motor case of the multi-shaft, multi-layer motor of FIG. 2.

Stator S has the following structure. FIG. 6 shows stator S of multi-shaft multi-phase motor M, and the motor case in vertical section.

Stator S is composed of stator segments arranged in circle. Each stator segment include one stator piece laminated member 41 of stator pieces 40 laminated in the axial direction, and one coil 42 formed on the laminated member 41 by winding strap copper wire so that the copper wire is extended back and forth in the axial direction.

Front and rear brackets 70 and 71, respectively, support the front and rear axial ends of stator piece laminated members 41 provided with coils 42 so that the laminated members 41 are arranged at regular intervals in a circle around the center axis of the motor. The laminated members 41 are clamped axially between front and rear brackets 70 and 71.

Front and rear end plates 47 and 49 are placed outside front and rear brackets 70 and 71, respectively. Front and rear brackets 70 and 71 are placed axially between front and rear end plates 47 and 49. Stator shaft 48 is fixed to front end plate 47.

Inner and outer bolts 44 and 45 are inserted through front and rear end plates 47 and 48, and tightened with nuts, to form the skeleton structure of stator S by fastening the components together.

Each of stator cooling pipes 72 for each defining an axial coolant passage is located circumferentially between adjacent two of the stator piece laminated members 41. Each cooling pipe 72 extends axially from a front pipe end supported by front bracket 70, to a rear pipe end supported by rear bracket 71.

Resin molding portion 46 is formed by pouring and filling molten resin in a mold having a cavity conforming to the shape of stator S, and including a skeleton structure supporting stator cooling pipes 72 in the cavity. Motor case 2 is formed with a coolant introduction passage 74 and a coolant discharge passage 74'. Bolts 77 fasten stator S to motor case 2.

The stator cooling structure is shown in FIGS. 7A, 7B, and 8~11. Stator S is disposed coaxially between inner and outer rotors IR and OR, and provided with coils 42 wound on stator piece laminated members 41 regularly arranged in a circle, and with coolant (branch) passages 43 for removing the heat produced by coils 42.

The cooling structure is formed by coolant introduction passage 90, coolant distributing cover member 91, coolant distributing plate member 92, first coolant passage (outward axial passage) 93, second coolant passage (return axial passage) 94, U-turn cover member 95, and coolant discharge passage 96.

Figure 7A:
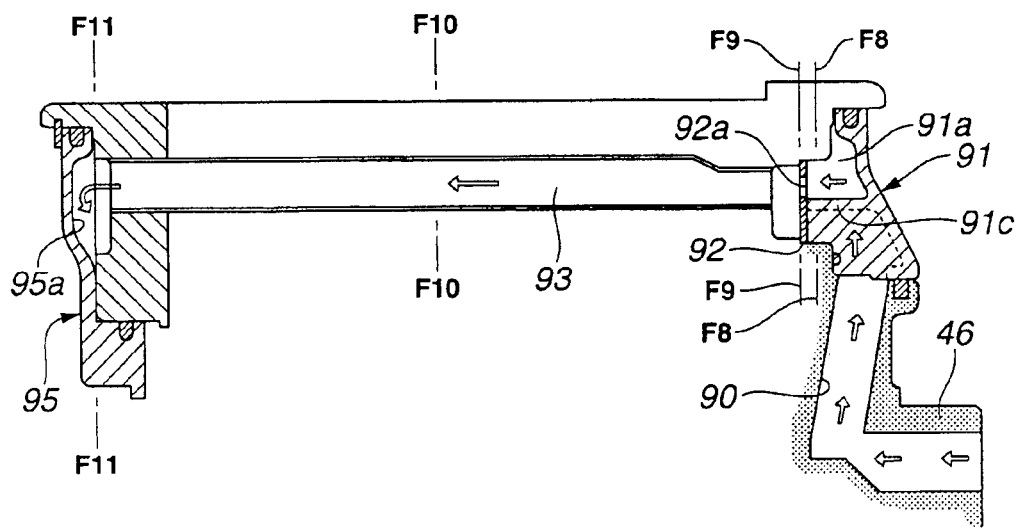
FIGS. 7A and 7B are sectional views showing one of branch passages in a stator cooling structure in the multi-shaft, multi-layer motor of FIG. 2.

Coolant introduction passage 90 is formed in resin molding portion 46, as shown in FIG. 7A, and arranged to introduce the coolant from the outside to a coolant inlet at one end of stator S.

Figure 8:
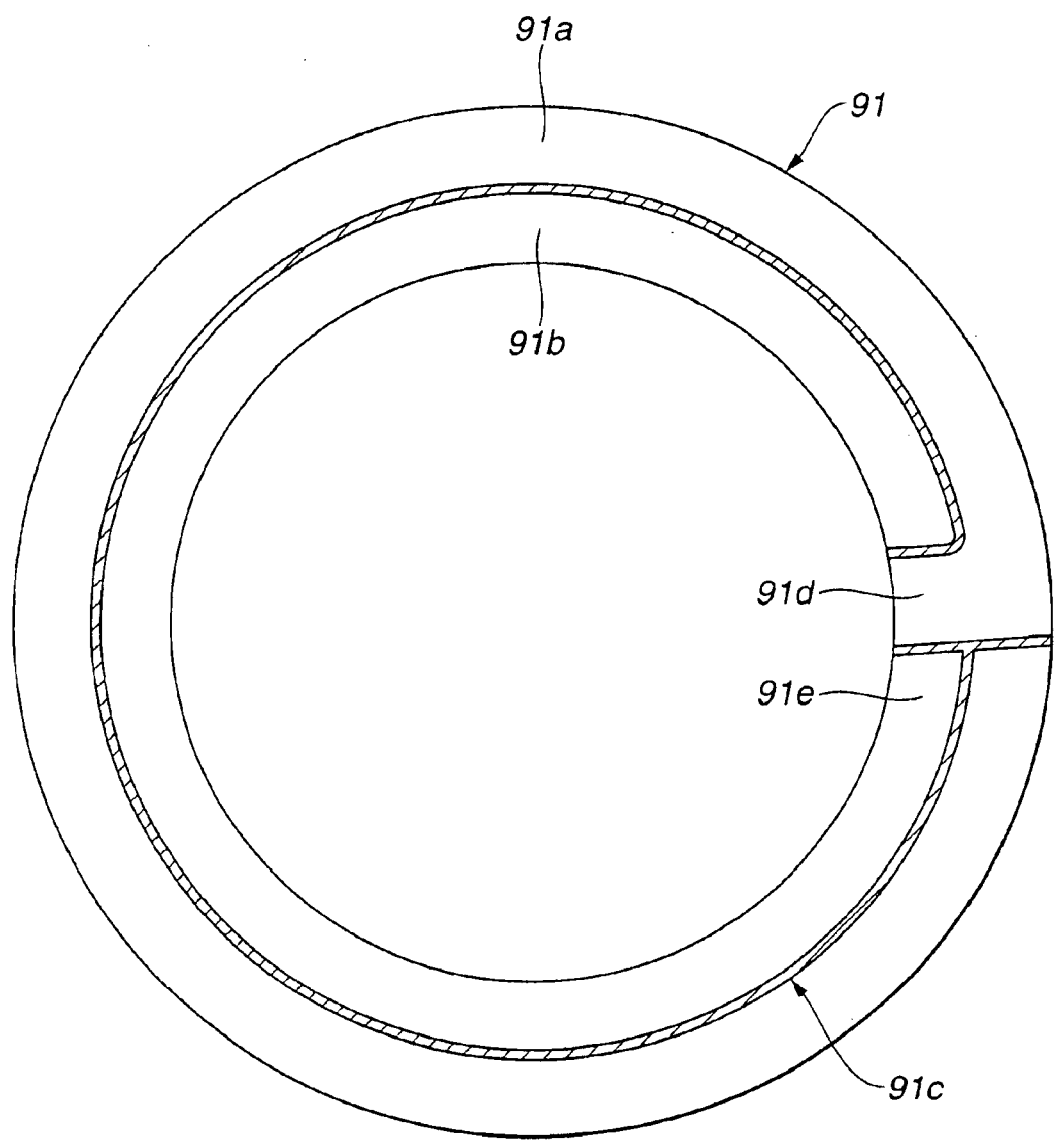
FIG. 8 is a sectional view taken across a line F8—F8 shown in FIG. 7A, for showing a coolant distributing cover member 91.

Coolant distribution cover member 91 is annular, as shown in FIG. 8, and formed with a circumferential partition wall 91c extending circumferentially and separating first and second (distributing and collecting) circumferential passages 91a and 91b. Coolant is led from coolant introduction passage 90 to a starting passage portion 91d of first (distributing) circumferential passage 1a.

Figure 9:
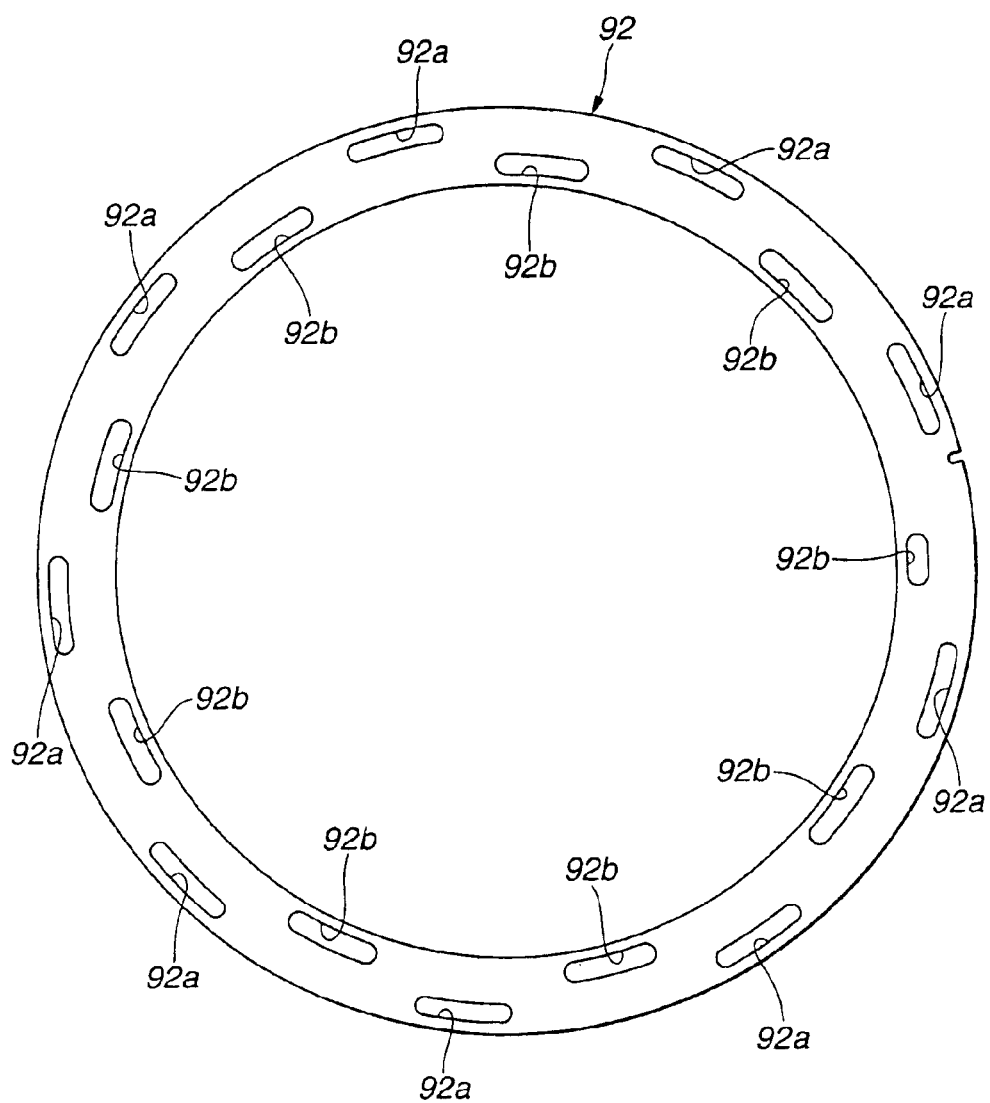
FIG. 9 is a sectional view taken across a line F9—F9 shown in FIG. 7A, for showing a coolant distributing plate member 92.

Coolant distribution plate member 92 forming a radial wall is formed with first (distributing) holes 92a arranged in a first circle to communicate with first (distributing) circumferential passage 91a; and second (collecting) holes 92b arranged in a second circle slightly smaller than the first circle, to communicate with second (collecting) circumferential passage 91b. In this example, first and second holes 92a and 92b are elongated circumferentially, as shown in FIG. 9.

Figure 10:
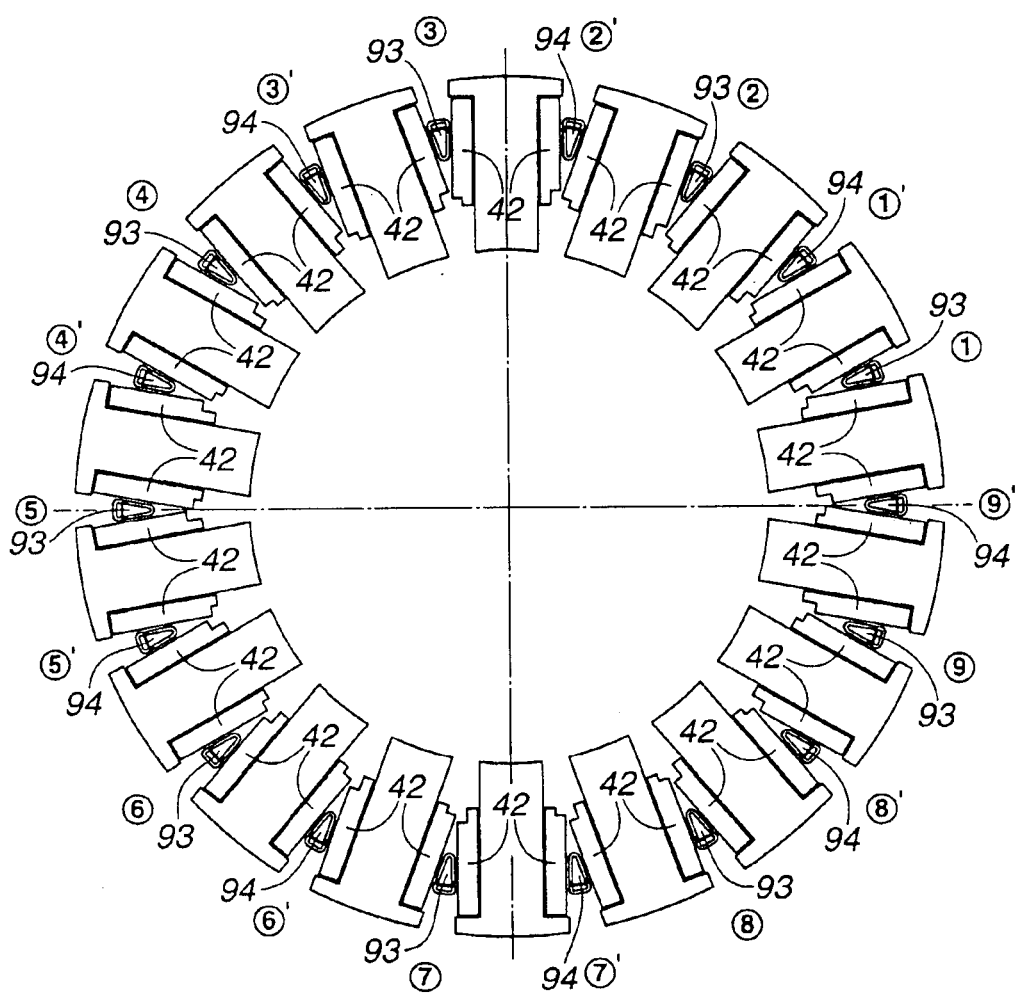
FIG. 10 is a sectional view taken across a line F10—F10 shown in FIG. 7A, for showing an alternate arrangement of axial coolant passages 93 and 94.

Each of first (outward) axial passages 93 is formed in resin molding portion 46 of stator S, as shown in FIG. 10. Each first axial passage 93 extends axially, and has a front side axial end communicating with one of first (distributing) holes 92a of plate member 92.

Each of second (return) axial passages 94 is formed in resin molding portion 46 of stator S, as shown in FIG. 10. Each second axial passage 94 extends axially, and has a front side axial end communicating with one of second (collecting) holes 92b of plate member 92.

Figure 11:
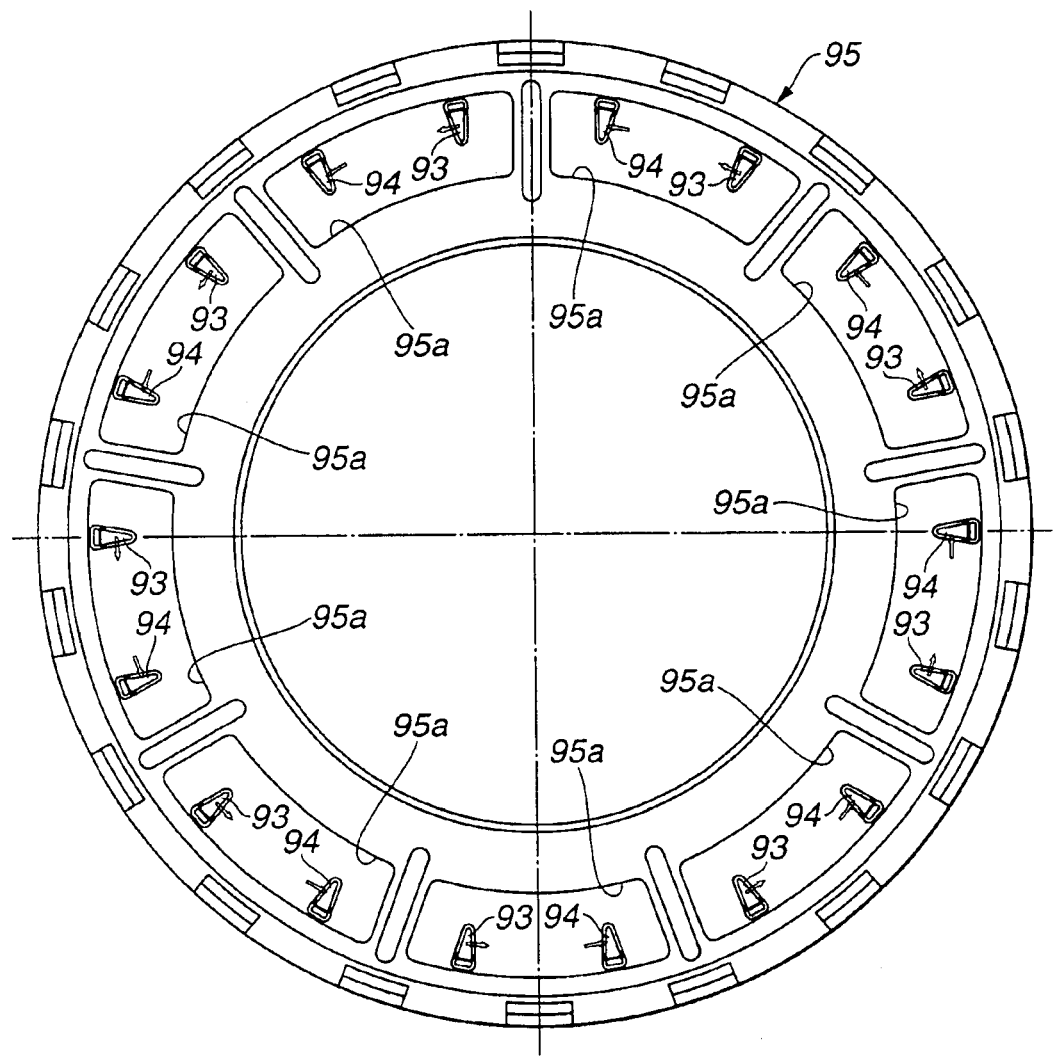
FIG. 11 is a sectional view taken across a line F11—F11 shown in FIG. 7A, for showing connecting portions 95a formed in a U-turn cover member 95.

U-turn cover member 95, as shown in FIG. 11, is formed with nine depressed connecting portions 95a connecting the rear side axial ends of first and second axial passages 93 and 94 adjacent to each other. Thus, each first axial passage 93 is connected with an adjacent one of second axial passages 94 to form a single continuous branch passage 43 extending in a U-shape. Each of (nine) branch passages 43 is defined by first and second axial passages 93 and 94 adjacent to each other in the circumferential direction, and one of depressed connecting portions 95a.

Coolant discharge passage 96 is arranged to discharge the coolant from an end portion 91e of second circumferential passage 91b of coolant distribution cover member 91. From each second (return) axial passage 94, the coolant flows through the corresponding one of collecting holes 92b into the second circumferential passage 91b, and further flows from end portion 91e of second circumferential passage 91, into discharge passage 96.

First and second axial passages 93 and 94 are arranged alternately, as shown in FIG. 10, and each of first and second axial passages 93 and 94 is located between two adjacent coils 42 adjoining each other in the circumferential direction. In FIG. 10, there are nine first axial passages ①~⑨, and nine second axial passages ①'~⑨'. Each of the nine first axial passages ①~⑨ is paired with a unique one of the nine second axial passages ①'~⑨' so that there are formed nine pairs; first pair of ① and ①', to ninth pair of ⑨ and ⑨'.

Circumferential partition wall 91c of coolant distribution cover member 91 in this embodiment is a cylindrical wall extending circumferentially so as to hold the sectional area of each of first and second circumferential passages 91a and 91b constant from one passage end to the other end. First circumferential passage 91a extends circumferentially with a uniform cross sectional size from the first passage end near starting end 91d connected with introduction passage 90, to the second passage end almost through 360°. Second circumferential passage 91b extends circumferentially with a uniform cross sectional size from the first passage end to the second passage end 91e leading to discharge passage 96. In this example, first circumferential passage 91a is on the radial outer side of partition wall 91c, and second circumferential passage 91b is on the radial inner side. The second end of second circumferential passage 91b is located at a position close to the first end of first circumferential passage 91a.

[Basic functions of Multi-shaft multi-layer motor] Multi-shaft, multi-layer motor M has the coaxial structure of two rotors and one stator for producing an outer rotor line of magnetic force, and an inner rotor line of magnetic force. Accordingly, coils 42 and a coil inverter are used in common for inner rotor IR and outer rotor OR. A motor control system can control inner and outer rotors IR and OR independently by supplying, to coils 42, a compound current formed by superposing a first current for driving inner rotor IR and a second current for driving outer rotor OR, as shown in FIG. 18. Multi-shaft, multi-layer motor M is a single motor in appearance, but this multi-shaft, multi-layer motor M can function as two motor/generators which can be controlled independently. The thus-constructed motor M is advantageous in size, cost and weight, as compared to an arrangement including a motor having a rotor and a stator, and a generator having a rotor and a stator. Moreover, the common use of stator coils for inner and outer rotors is effective in reducing the loss such as copper loss and switching loss. By controlling the compound current, the motor control system can control multi-shaft, multi-layer motor M flexibly in various modes including a mode of motor plus generator, a mode of motor plus motor and a mode of generator plus generator. Especially when used in a power system for a hybrid vehicle as in the first embodiment, multi-shaft, multi-layer motor M can be controlled most effectively and efficiently in accordance with a vehicle operating condition. Such an electrical machine having a common stator and a plurality of rotors is disclosed in U.S. Pat. No. 6,049,152. Explanations and figures of this U.S. Pat. No. 6,049,152 on a rotary electric machine or motor/generator, and drive circuit and method for driving the machine are hereby incorporated by reference.

[Stator cooling function of Multi-shaft multi-layer motor] Heat is generated by coils 42 and stator pieces 40 when a heavy current is supplied to coils 42 to drive multi-shaft, multi-layer motor M. This heat can deteriorate the electrical efficiency and mechanical efficiency of the motor. In multi-shaft, multi-layer motor M, the heat generators in the form of coils 42 are arranged at regular angular intervals around the motor center axis in a manner of rotation symmetry in stator S. The cooling structure according to this embodiment is arranged to provide uniform cooling effect circumferentially around the motor center axis.

Figure 7B:
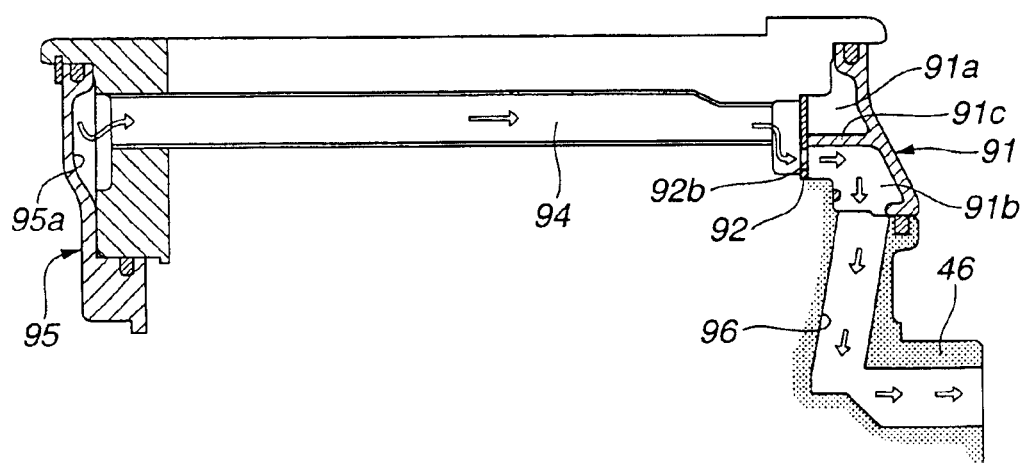
Figure 12:
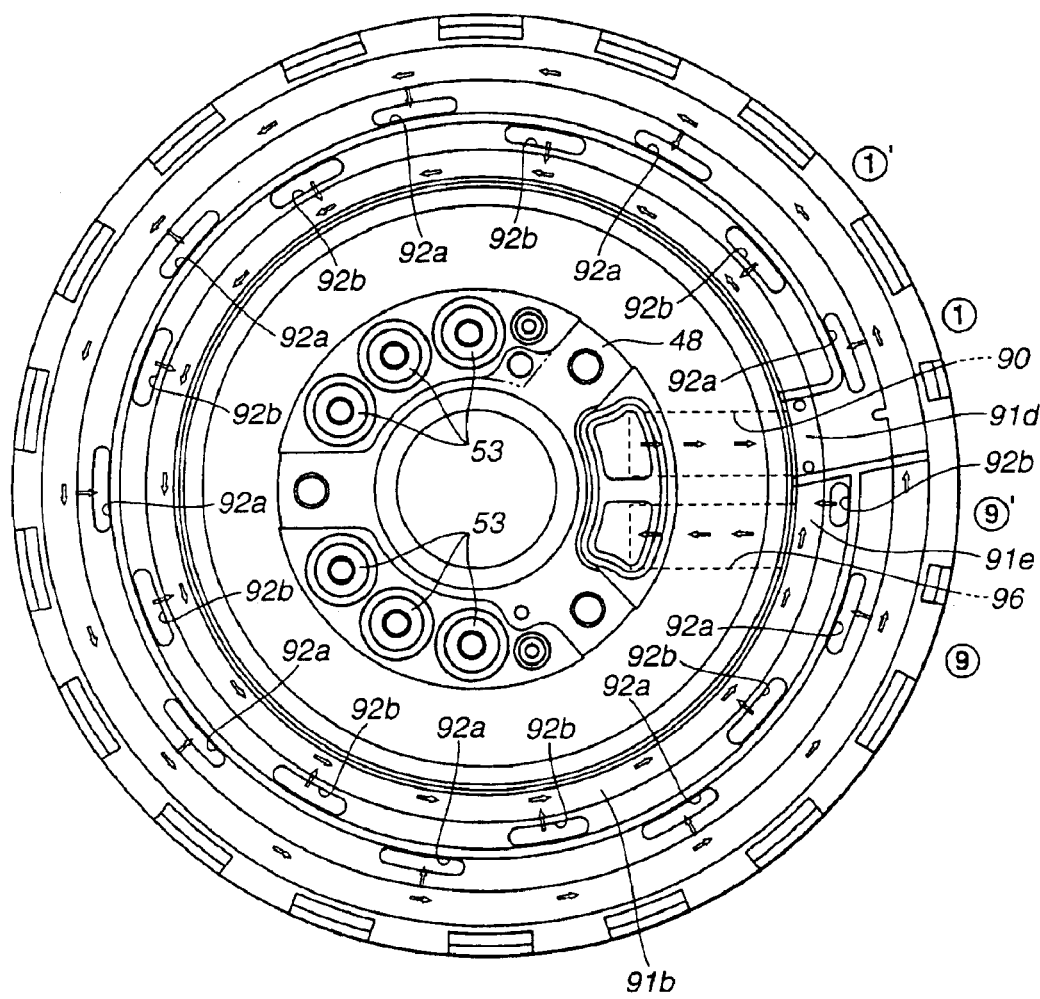
FIG. 12 is a view for illustrating coolant flows in coolant distributing cover member 91.

FIG. 12 illustrates the stator cooling operation of the stator cooling structure according to the first embodiment, together with FIGS. 7A and 7B.

The coolant is introduced from the outside, through introduction passage 74 formed in motor case 2, into the stator cooling structure. Then, as shown in FIG. 7A, the coolant flows in the path of introduction passage 90→ distributing circumferential passage 91a in cover member 91→ distributing holes 92a opened in plate member 92→ first (outward) axial passages 93→ connecting depressed portions 95a in U-turn cover member 95. In this way, the coolant flows from the front side (the right side as viewed in FIG. 7A) to the back side (the left side in FIG. 7A).

From the back side to the front side, as shown in FIG. 7B, the coolant flows in the path of connecting depressed portions 95a in U-turn cover member 95→ second (return) axial passages 94→ collecting holes 92b opened in plate member 92→ collecting circumferential passage 91b in cover member 91→ discharge passage 96. From discharge passage 96, the coolant is discharged to the outside through discharge passage 74' formed in motor case 2.

In this example shown in the figures, first and second axial passages 93 and 94 are arranged alternately at regular angular intervals around the motor axis in a manner of rotation symmetry, as best shown in FIG. 10. Each of first and second axial passages 93 and 94 is placed between two adjacent stator coils 42. In the example of FIG. 10, each of first axial passages 93 is paired with the second axial passage 94 adjacent to or next to the first axial passage 93, to form a single continuous branch coolant passage. Each branch passage is formed by one adjacent pair of first and second axial passage 93 and 94 which are adjacent in the circumferential direction around the motor axis, and one of the connecting depressed portions 95a in U-turn cover member 95. In the example shown in FIGS. 10 and 11, first and second axial passages 93 and 94 are located at the same radial position on a common circle around the motor axis.

Distributing circumferential passage 91a and collecting circumferential passage 91b are separated from each other by the circumferentially extending partition wall 91c, as shown in FIG. 8. Circumferential passages 91a and 91b extend side by side circumferentially through an angle slightly smaller than 360° from respective first ends which are located at a first angular position, to respective second ends which are located at a second angular position around the motor axis. In this example, collecting circumferential passage 91b is surrounded by distributing circumferential passage 91a. The first end of distributing circumferential passage 91a is fluidly connected with introduction passage 90 through an inlet port or coolant introduction port defined by the portion 91d. The second end of collecting circumferential passage 91b is fluidly connected with discharge passage 96 through an outlet port or coolant discharge port defined by the portion 91e. In the example of FIG. 8, the second end of distributing circumferential passage 91a is closed by a radially extending wall, and the first end of collecting circumferential passage 91b is closed by a radially extending wall.

In distributing plate member 92 defining the radial wall bounding distributing and collecting circumferential passages 91a and 91b, each of distributing holes 92a extends axially along the center axis from the distributing circumferential passage 91a, and forms the upstream end of a unique one of the branch passages. Each of collecting holes 92b forms the downstream end of a unique one of the branch passages, and opens to collecting circumferential passage 91b. Distributing holes 92a are arranged in a first circle around the center axis, and collecting holes 92b are arranged in a second circle concentric with the first circle and smaller in diameter than the first circle in the example of FIG. 9. Distributing and collecting holes 92a and 92b are arranged alternately around the center axis, as shown in FIG. 9. The first and second axial passages of each branch passage are separated circumferentially by one of the stator segments; and only one of the stator segments is interposed circumferentially between the first and second axial passages of each of the branch passages.

In the thus-constructed cooling structure, the first through ninth branch passages are uniformized in the total flow length. In the case of the first branch passage formed by the first axial passage ① and second axial passage ①' shown in FIG. 12, the fluid passage length from the coolant introduction port defined by introduction passage 90 and passage portion 91d, to the distribution hole 92a communicating with the first axial passage ① is short, whereas the fluid passage length from the collecting hole 92b communicating with the second axial passage ①' to the discharge port defined by discharge passage 96 and passage portion 91e is long. In the case of the ninth branch passage formed by the first axial passage ⑨ and second axial passage ⑨' shown in FIG. 12, the fluid passage length from the coolant introduction port defined by introduction passage 90 and passage portion 91d, to the distribution hole 92a communicating with the first axial passage ⑨ is long, whereas the fluid passage length from the collecting hole 92b communicating with the second axial passage ⑨' to the discharge port defined by discharge passage 96 and passage portion 91e is short.

In this way, the total flow length in distributing circumferential passage 91a and collecting circumferential passage 91b is set approximately equal to a uniform length (slightly shorter than the circumferential length of partition wall 91 extending circumferentially through the angle slightly smaller than 360°). Therefore, the coolant flows in the branch passages with uniform total flow distance can cool the stator uniformly around the center axis, and reduce the nonuniformity in the cooling effect.

Moreover, it is possible further to adjust the sizes of distributing holes 92a and collecting holes 92b in plate member 92 to adjust the flow resistances, and thereby to uniformize the flow rates through branch passages 43. U-turn cover member 95 is pushed outward in the axial direction by the flow of the coolant in connecting portions 95a. This pushing force is applied, as a preload, to bearing 83 supporting stator S.

In this way, the cooling structure according to the first embodiment can uniformize the flow conditions of the first through last branch passage. The axial passages 93 and 94 and stator coils 42 are arranged alternately in the circumferential direction in a compact and close manner so as to cool the coils efficiently. Circumferential partition wall 91c of the first embodiment is a cylindrical wall making each of the circumferential passages 91a and 91b uniform in cross sectional size from the first end to the second end around the motor axis, and thereby uniformizing the flow resistance.

FIGS. 13~17 show a stator cooling structure for multishaft, multi-layer motor M according to the second embodiment of the present invention. In the second embodiment, the circumferential partition wall in the distributing cover member is in the form of stepwise spiral wall.

Figure 16:
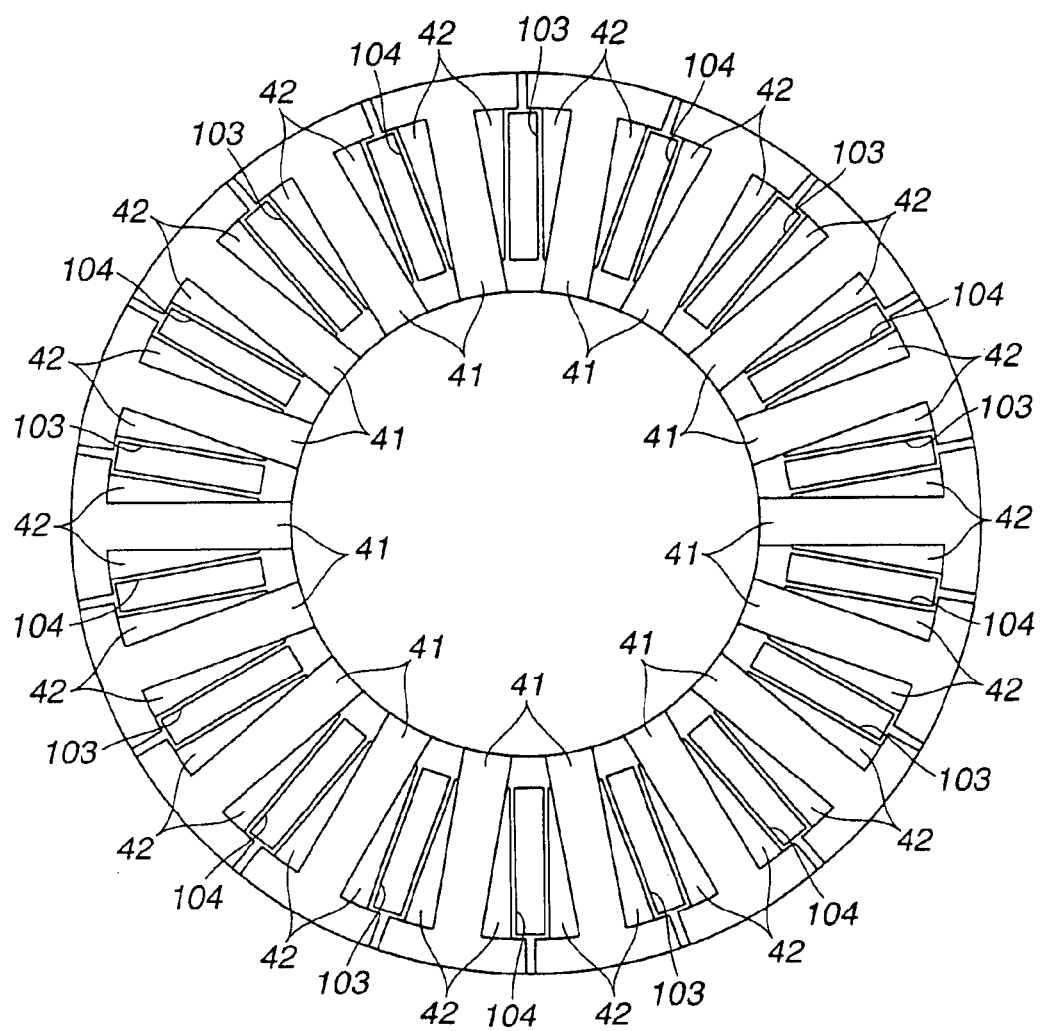
FIG. 16 is a cross sectional view taken across a line F16—F16 shown in FIG. 13, for showing an alternate arrangement of axial coolant passages 103 and 104.
Figure 17:
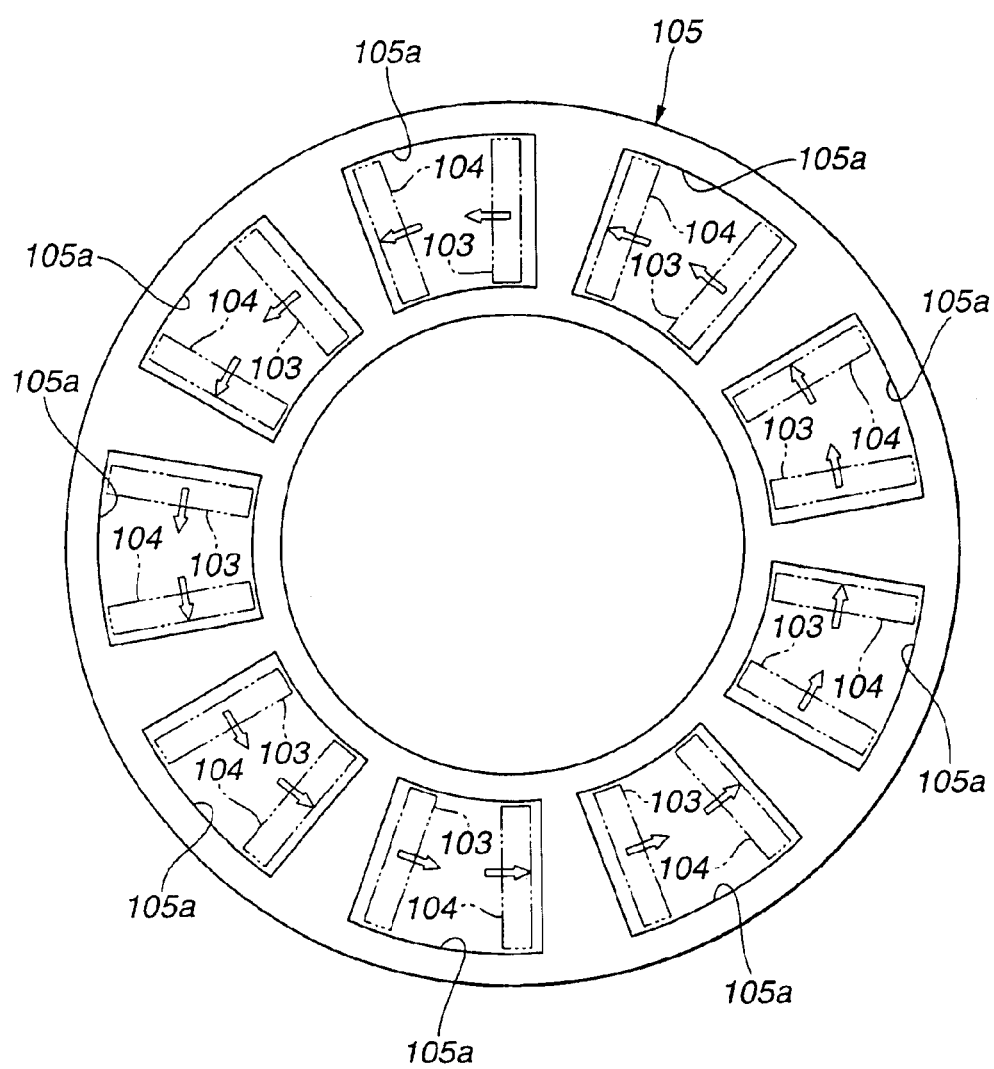
FIG. 17 is a cross sectional view taken across a line F17—F17 shown in FIG. 13, for showing connecting portions 105a formed in a U-turn cover member 105 of the second embodiment.

As shown in FIG. 16, stator S of multi-shaft, multi-layer motor M according to the second embodiment includes a plurality of laminated members (stator segments) 41 each provided with a coil 42 (polyphase coil), and cooling (branch) passages (43) for cooling the heat generated by coils 42, as in the first embodiment. Stator segments 41 are arranged at regular angular intervals around the motor axis.

The stator cooling structure includes a coolant introduction passage 100, a coolant distributing cover member 101, a coolant distributing plate member 102, first (outward) axial passages 103, second (return) axial passages 104, a U-turn cover member 105, and a coolant discharge passage 106.

Figure 13:
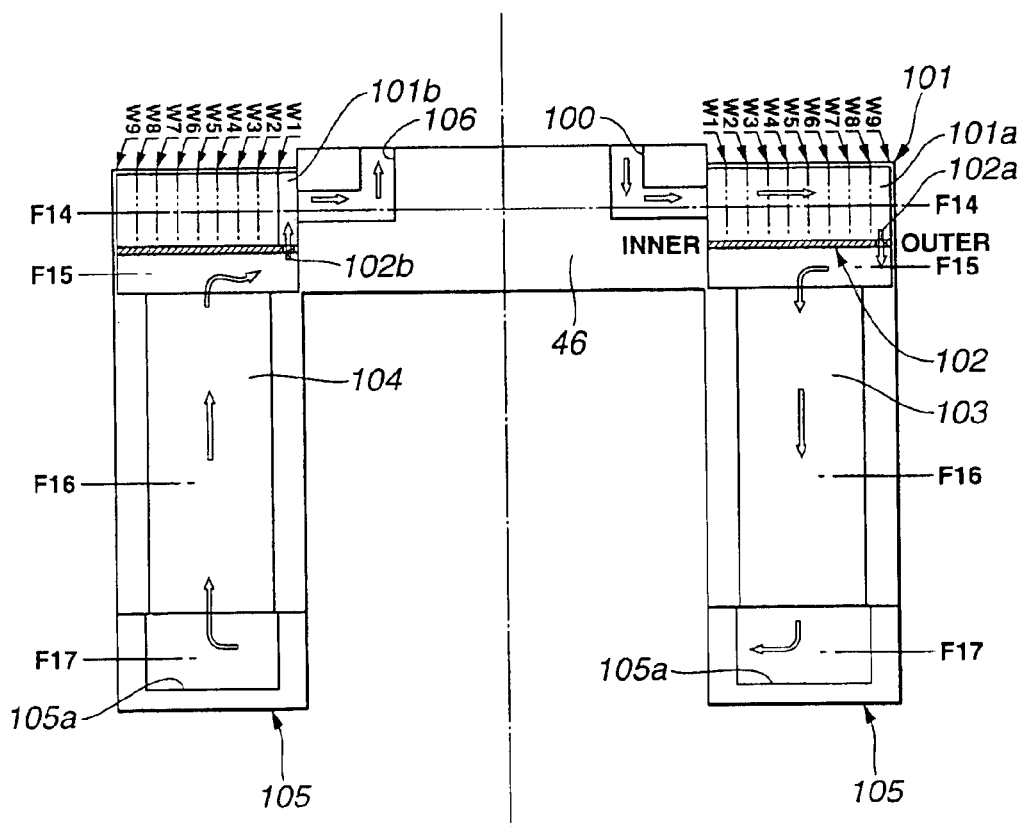
FIG. 13 is a sectional view showing a stator cooling structure according to a second embodiment of the present invention.

Coolant introduction passage 100 is formed in the resin molding portion 46 as shown in FIG. 13, and designed to introduce the coolant from the outside to an inlet for the coolant in the stator cooling structure.

Figure 14:
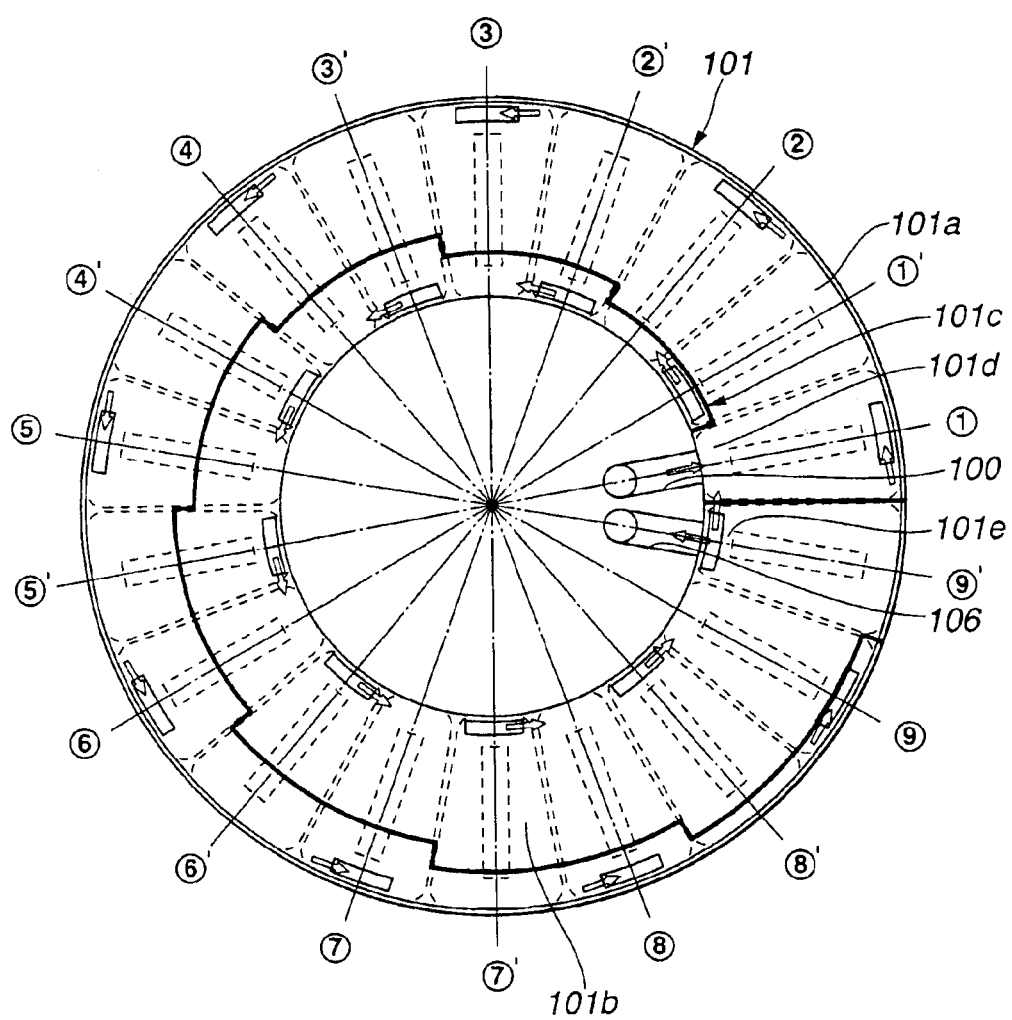
FIG. 14 is a cross sectional view taken across a line F14—F14 shown in FIG. 13, for showing a coolant distributing cover member 101 of the second embodiment.

Coolant distributing cover member 101 is an annular member including a circumferential partition wall 101c separating a distributing circumferential passage 101a and a collecting circumferential passage 101b, as shown in FIG. 14. The coolant is introduced from coolant introduction passage 100 to a coolant introduction port defined by a starting portion 101d of distributing circumferential passage 101a.

Figure 15:
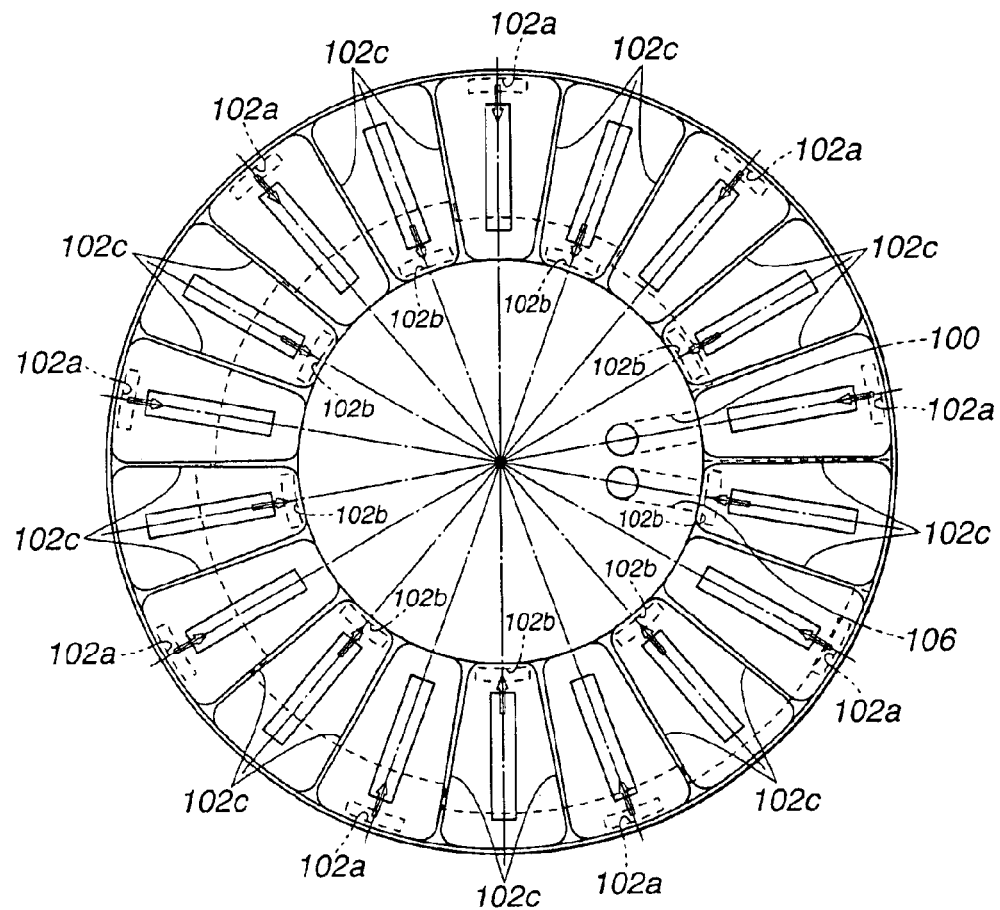
FIG. 15 is a cross sectional view taken across a line F15—F15 shown in FIG. 13, for showing a coolant distributing plate member 102 of the second embodiment.

Coolant distributing plate member 102, as shown in FIG. 15, is formed with distributing holes 102a communicating with distributing circumferential passage 101a, and collecting holes 102b opening to collecting circumferential passage 101b. Each of branch cooling passages extends from one of distributing holes 102a, to the collecting hole 102b adjacent to the distributing hole 102a. Distributing holes 102a and collecting holes 102b are arranged alternately around the motor axis as in the first embodiment. Each of holes 102a and 102b is interposed circumferentially between two adjacent radial partition walls 102c, as shown in FIG. 15. Radial partition walls 102c are arranged regularly around the motor axis as shown in FIG. 15.

Each of first (outward) axial passages 103 extends axially in the resin molding portion 46, as shown in FIG. 16, from a first axial end communicating with one of distributing holes 102a. Each of second (return) axial passages 104 extends axially in the resin molding portion 46, as shown in FIG. 16, from a first axial end communicating with one of collecting holes 102b. U-turn cover member 105 is formed with connecting depressed portions 105a each fluidly connecting the second ends of first and second axial passages 103 and 104 adjacent to each other in the circumferential direction, to form a branch passage.

Coolant discharge passage 106, as shown in FIG. 13, extends from a downstream end 101e of collecting circumferential passage 101b of distributing cover member 101, to discharge the coolant from the downstream end 101e of collecting circumferential passage 101b.

Each of first and second axial passages 103 and 104 is placed between two adjacent stator coils 42, as shown in FIG. 16. Each of first axial passages 103 is paired with the second axial passage 104 adjacent to or next to the first axial passage 103, to form one of the branch coolant passages. In the example shown in FIG. 14, there are nine pairs ①–①' through ⑨–⑨' as in the first embodiment.

Circumferential partition wall 101c of coolant distributing cover member 101 is in the form of spiral wall extending circumferentially around the motor axis at a gradually increasing radial distance from the center, as shown in FIG. 14. In this example, the spiral partition wall 101c is stepwise, and includes a plurality of circumferential wall sections such as first through ninth wall sections W1~W9. Therefore, distributing circumferential passage 101a is tapered so that the cross sectional area is decreased gradually (stepwise in this example) from the first end connected with introduction passage 100, toward the second end. On the other hand, collecting circumferential passage 101b is flared so that the cross sectional section of collecting circumferential passage 101b is increased gradually (stepwise in this example) from the first end to the second end leading to discharge passage 106. In other respects, the cooling structure of the second embodiment is substantially identical to the cooling structure of the first embodiment.

The cooling structure according to the second embodiment is arranged to provide uniform cooling effect circumferentially around the motor center axis. FIG. 13 illustrates the stator cooling operation of the stator cooling structure according to the second embodiment.

The coolant is introduced from the outside, through introduction passage 74 formed in motor case 2, into the stator cooling structure. Then, as shown in the right side of FIG. 13, the coolant flows in the path of introduction passage 100→ distributing circumferential passage 101a in cover member 101→ distributing holes 102a opened in plate member 102→ first (outward) axial passages 103→ connecting depressed portions 105a in U-turn cover member 105. In this way, the coolant flows from the front side (the upper side as viewed in FIG. 13) to the back side (the lower side in FIG. 13).

From the back side to the front side, as shown in the left side of FIG. 13, the coolant flows in the path of connecting depressed portions 105a in U-turn cover member 105→ second (return) axial passages 104→ collecting holes 102b opened in plate member 102→ collecting circumferential passage 101b in cover member 101→ discharge passage 106. From discharge passage 106, the coolant is discharged to the outside through discharge passage 74' formed in motor case 2.

In this cooling structure, first and second axial passages 103 and 104 are arranged alternately at regular angular intervals around the motor axis in a manner of rotation symmetry, as best shown in FIG. 16. Each of first and second axial passages 103 and 104 is placed between two adjacent stator coils 42. Each of first axial passages 103 is paired with the second axial passage 104 adjacent to or next to the first axial passage 103, to form a branch coolant passage. Each branch passage is formed by one adjacent pair of first and second axial passage 103 and 104 which are adjacent in the circumferential direction around the motor axis, and one of the connecting depressed portions 105a in U-turn cover member 105.

Circumferential passages 101a and 101b extend side by side circumferentially through an angle slightly smaller than 360° from respective first ends which are located at a first angular position, to respective second ends which are located at a second angular position around the motor axis. The first end of distributing circumferential passage 101a is fluidly connected with introduction passage 100 through an inlet port or coolant introduction port defined by the starting portion 101d. The second end of collecting circumferential passage 101b is fluidly connected with discharge passage 106 through an outlet port or coolant discharge port defined by the ending portion 91e.

In distributing plate member 102, distributing and collecting holes 102a and 102b are arranged alternately around the center axis, as shown in FIG. 15. The first and second axial passages 103 and 104 of each branch passage are separated circumferentially by one of the stator segments; and only one of the stator segments is interposed circumferentially between the first and second axial passages 103 and 104 of each of the branch passages.

In the thus-constructed cooling structure, the first through ninth branch passages are uniformized in the total flow length. In the case of the first branch passage formed by the first axial passage ① and second axial passage ①' shown in FIG. 14, the fluid passage length from the coolant introduction port defined by introduction passage 100 and passage portion 101d, to the distribution hole 102a communicating with the first axial passage ① is short, whereas the fluid passage length from the collecting hole 102b communicating with the second axial passage ①' to the discharge port defined by discharge passage 106 and passage portion 101e is long. In the case of the ninth branch passage formed by the first axial passage ⑨ and second axial passage ⑨' shown in FIG. 14, the fluid passage length from the coolant introduction port defined by introduction passage 100 and passage portion 101d, to the distribution hole 102a communicating with the first axial passage ⑨ is long, whereas the fluid passage length from the collecting hole 102b communicating with the second axial passage ⑨' to the discharge port defined by discharge passage 106 and passage portion 101e is short.

In this way, the total flow length in distributing circumferential passage 101a and collecting circumferential passage 101b is set approximately equal to a uniform length. Therefore, the coolant flowing in the branch passages with uniform total flow distance can cool the stator uniformly around the center axis, and reduce the nonuniformity in the cooling effect, as in the first embodiment.

The cooling structure according to the second embodiment can uniformize the flow conditions of the first through last branch passage, as in the first embodiment. The axial passages 103 and 104 and stator coils 42 are arranged alternately in the circumferential direction in such a manner as to cool the coils efficiently. In the second embodiment, circumferential partition wall 101c is a spiral wall making the cross sectional size of distributing circumferential passage 101a gradually smaller from the upstream end toward the downstream end, and making the cross sectional size of collecting circumferential passage 101b gradually greater from the upstream end toward the downstream end, so that the flow velocity of the coolant is made uniform in these passages.

In the illustrated embodiments, means for defining branch passages corresponds to at least one of resin molding portion 46, stator cooling pipes 72, and U-turn cover member 95 or 105. Means for defining distributing and collecting circumferential passages corresponds to cover member 91 or 101. Means for arranging the upstream ends of the first through last branch passages in a row along the distributing circumferential passage in a direction away from the common introduction port corresponds distribution holes 92a or 102a and plate member 92 or 102. Means for arranging the downstream ends of the first through last branch passages in a row along the collecting circumferential passage in a direction toward the common discharge port corresponds to collecting holes 92b or 102b and plate member 92 or 102.

This application is based on a prior Japanese Patent Application No. 2002-231679. The entire contents of the prior Japanese Patent Application No. 2002-231679 with a filing date of Aug. 8, 2002 in Japan are hereby incorporated by reference.

Although the invention has been described above by reference to certain embodiments of the invention, the invention is not limited to the embodiments described above. Modifications and variations of the embodiments described above will occur to those skilled in the art in light of the above teachings. In the illustrated embodiments, the stator cooling structure is applied to a multi-shaft, multi-layer motor in a drive system for a hybrid vehicle. However, the cooling structure according to the present invention can be applied to various other motors. The scope of the invention is defined with reference to the following claims.

What is claimed is:

1. A multi-shaft, multi-layer motor comprising:
   an inner rotor;
   an outer rotor surrounding the inner rotor;
   a stator assembly disposed coaxially between the inner and outer rotors, the stator assembly comprising:
   a plurality of laminated members arranged regularly around a center axis of the motor, and each provided with a coil;
   a portion defining a coolant introduction passage to introduce a coolant for drawing off heat produced by the coils;
   a coolant distributing annular cover member including a circumferential partition wall separating a first circumferential coolant passage and a second circumferential coolant passage, the first circumferential coolant passage including an inlet end connected with the introduction passage, to receive the coolant from the introduction passage;
   a coolant distributing plate member formed with first holes communicating with the first circumferential coolant passage, and second holes communicating with the second circumferential coolant passage;
   portions defining first axial coolant passages each extending, in an axial direction of the motor, from a first axial end communicating with one of the first holes, to a second axial end;
   portions defining second axial coolant passages each extending, in the axial direction, from a second axial end to a first axial end communicating with one of the second holes;
   a U-turn cover member formed with connecting portions each to connect the second ends of one of the first axial passages and one of the second axial passages which are adjacent to each other in a circumferential direction around the center axis; and
   a portion defining a coolant discharge passage connected with an outlet end of the second circumferential passage, and arranged to discharge the coolant from an outlet end of the second circumferential passage.

2. The multi-shaft, multi-layer motor as claimed in claim 1, wherein the portions defining the first and second axial coolant passages are resin molding portions; and each of the first and second axial passages is formed between adjacent two of the coils adjacent to each other in the circumferential direction.

3. The multi-shaft, multi-layer motor as claimed in claim 1, wherein the circumferential partition wall is a cylindrical wall separating the first and second circumferential passages so that the first circumferential passage extends circumferentially around the center axis of the motor with a uniform cross sectional area from an upstream end adjacent to the inlet end to a downstream end, and that the second circumferential passage extends circumferentially around the center axis of the motor with a uniform cross sectional area from an upstream end to a downstream end formed with the outlet end.

4. The multi-shaft, multi-layer motor as claimed in claim 1, wherein the circumferential partition wall is a spiral wall separating the first and second circumferential passages so that a cross sectional area of the first circumferential passage is decreased gradually from an upstream end adjacent to the inlet end to a downstream end of the first circumferential passage, and that a cross sectional area of the second circumferential passage is increased gradually from an upstream end to a downstream end formed with the outlet end.

5. The multi-shaft, multi-layer motor as claimed in claim 1, wherein the first holes are arranged in a first circle around the center axis; the second holes are arranged in a second circle concentric with the first circle; the first and second holes are arranged alternately around the center axis; one of the first axial passage, one of the second axial passages, and one of the connecting portions form a branch passage; each of the branch passages extends from one of the first holes to one of the second holes; and the first and second holes of each of the branch passages are adjacent to each other in the circumferential direction.

6. The multi-shaft, multi-layer motor as claimed in claim 2, wherein the circumferential partition wall is a cylindrical wall separating the first and second circumferential passages so that the first circumferential passage extends circumferentially around the center axis of the motor with a uniform cross sectional area from an upstream end adjacent to the inlet end to a downstream end, and that the second circumferential passage extends circumferentially around the center axis of the motor with a uniform cross sectional area from an upstream end to a downstream end formed with the outlet end.

7. The multi-shaft, multi-layer motor as claimed in claim 2, wherein the circumferential partition wall is a spiral wall separating the first and second circumferential passages so that a cross sectional area of the first circumferential passage is decreased gradually from an upstream end adjacent to the inlet end to a downstream end of the first circumferential passage, and that a cross sectional area of the second circumferential passage is increased gradually from an upstream end to a downstream end formed with the outlet end.

8. A multi-shaft, multi-layer motor comprising:
   an inner rotor;
   an outer rotor surrounding the inner rotor; and a
   stator assembly disposed coaxially between the inner and outer rotors, the stator assembly comprising:
   a plurality of stator segments arranged around a center axis of the motor, each of the stator segments including a stator coil;
   portions defining first through last branch passages arranged around the center axis, each of the branch passages extending from an upstream end to a downstream end to cool the stator coils; and
   a distributing section defining a distributing circumferential passage to deliver a coolant from a common introduction port to the upstream ends of the first through last branch passages, and a collecting circumferential passage to convey the coolant from the downstream ends of the first through last branch passages to a common discharge port,
   the distributing circumferential passage and the collecting circumferential passage extending circumferentially around the center axis, the upstream ends of the first through last branch passages being arranged in sequence along the distributing circumferential passage in a direction away from the common introduction port, and the downstream ends of the first through last branch passages being distributed in sequence along the collecting circumferential passage in a direction toward the common discharge port.

9. The multi-shaft, multi-layer motor as claimed in claim 8, wherein the distributing circumferential passage and the collecting circumferential passage extend side by side from respective first ends which are located at a first circumferential position, to respective second ends which are located at a second circumferential position; the first end of the distributing circumferential passage communicates with the common introduction port so that the collant in the distributing circumferential passage flows in a rotational direction from the first end toward the second end; the second end of the collecting circumferential passage is connected with the common discharge port so that the coolant in the collecting circumferential passage flows in a rotational direction from the first end toward the second end.

10. The multi-shaft, multi-layer motor as claimed in claim 8, wherein the distributing section comprises a circumferential partition wall extending circumferentially and separating the distributing circumferential passage and the collecting circumferential passage from each other, and a radial wall formed with distributing holes each extending axially along the center axis from the distributing circumferential passage and forming the upstream end of a unique one of the branch passages, and collecting holes each forming the downstream end of a unique one of the branch passages and opening to the collecting circumferential passage.

11. The multi-shaft, multi-layer motor as claimed in claim 10, wherein each of the branch passages comprises a first axial passage extending from a first axial end defining the upstream end of the branch passage, to a second axial end in the axial direction, a second axial passage extending from a second axial end to a first axial end defining the downstream end of the branch passage, and a connecting portion connecting the second axial ends of the first and second axial passages; wherein the distributing holes are arranged in a first circle around the center axis; the collecting holes are arranged in a second circle concentric with the first circle; and the distributing and collecting holes are arranged alternately around the center axis; and wherein the first and second axial passages of each branch passage are separated circumferentially by one of the stator segments; and only one of the stator segments is interposed circumferentially between the first and second axial passages of each of the branch passages.

12. A multi-shaft, multi-layer motor comprising:
an inner rotor;
an outer rotor surrounding the inner rotor, and
a stator assembly disposed coaxially between the inner and outer rotors, the stator assembly comprising:
a plurality of stator segments arranged around a center axis of the motor, each of the stator segments including a stator coil;
means for defining first through last branch passages arranged around the center axis, each of the branch passages extending from an upstream end to a downstream end to cool the stator coils; and
means for defining a distributing circumferential passage to deliver a coolant from a common introduction port to the upstream ends of the first through last branch passages, and a collecting circumferential passage to convey the coolant from the downstream ends of the first through last branch passages to a common discharge port;
means for arranging the upstream ends of the first through last branch passages in a row along the distributing circumferential passage in a direction away from the common introduction port; and
means for arranging the downstream ends of the first through last branch passages in a row along the collecting circumferential passage in a direction toward the common discharge port.

13. The multi-shaft, multi-layer motor as claimed in claim 9, wherein the distributing section comprises a circumferential partition wall extending circumferentially and separating the distributing circumferential passage and the collecting circumferential passage from each other, and a radial wall formed with distributing holes each extending axially along the center axis from the distributing circumferential passage and forming the upstream end of a unique one of the branch passages, and collecting holes each forming the downstream enà of a unique one of the branch passages and opening to the collecting circumferential passage.

14. The multi-shaft, multi-layer motor as claimed in claim 13, wherein each of the branch passages comprises a firs axial passage extend ing from a first axial end defining the upstream end of the branch passage, to a second axial end in the axial direction, a second axial passage extending from a second axial end to a first axial end defihing the downstream end of the branch passage, and a connecting portion connecting the second axial ends of the first and second axial passages', wherein the distributing holes are arranged in a first circle around the center axis; the collecting holes are arranged in a second circle concentric with the first circle', and the distributing and collecting holes are arranged alternately around the center axis; and wherein the first and second axial passages of each branch passage are separated cicumferentially by one of the stator .segments; and only one of the stator segments is interposed circumferentially between the first and second axial passages of each of the branch passages.

* * * * *